United States Patent
Khoury (12)

(10) Patent No.: US 10,657,927 B2
(45) Date of Patent: May 19, 2020

(54) SYSTEM FOR PROVIDING HANDS-FREE INPUT TO A COMPUTER

(71) Applicant: Elias Khoury, Haifa (IL)

(72) Inventor: Elias Khoury, Haifa (IL)

(*) Notice: Subject to any disclaimer, the term of this patent is extended or adjusted under 35 U.S.C. 154(b) by 0 days.

(21) Appl. No.: 16/346,620

(22) PCT Filed: Nov. 3, 2017

(86) PCT No.: PCT/IL2017/051204
§ 371 (c)(1),
(2) Date: May 1, 2019

(87) PCT Pub. No.: WO2018/083701
PCT Pub. Date: May 11, 2018

(65) Prior Publication Data
US 2019/0287486 A1 Sep. 19, 2019

(30) Foreign Application Priority Data
Nov. 3, 2016 (IL) .......................................... 248721

(51) Int. Cl.
*G09G 5/08* (2006.01)
*G09G 5/14* (2006.01)
(Continued)

(52) U.S. Cl.
CPC ............... *G09G 5/14* (2013.01); *G06F 1/163* (2013.01); *G06F 3/011* (2013.01); *G06F 3/013* (2013.01);
(Continued)

(58) Field of Classification Search
CPC .......... G09G 3/001; G09G 5/006; G09G 5/14; G06F 1/163; G06F 3/011; G06F 3/013; G06F 3/017; G06F 3/1454
(Continued)

(56) References Cited

U.S. PATENT DOCUMENTS

| | | | |
|---|---|---|---|
| 5,402,109 A * | 3/1995 | Mannik ................. | G02C 5/001 340/575 |
| 6,559,770 B1 * | 5/2003 | Zoerb .................... | G08B 21/06 340/575 |

(Continued)

OTHER PUBLICATIONS

International Search Report for the related Application No. PCT/IL201/051204. dated May 7, 2019.

*Primary Examiner* — Adam J Snyder
(74) *Attorney, Agent, or Firm* — Honigman LLP (57) ABSTRACT

A system for providing hands-free input to a computer. The system includes one or more artificial cilia mounts attached to an eyelid or eyelash of a user, by which one or more of the artificial cilia extending therefrom are adapted to cause generation of an input command in response to an intentional blinking motion, and a computer to which blinking-derived input commands are transmittable. The system further includes a movement sensor mounted for detecting a calibrated instantaneous head orientation of the user. The system includes a means for duplicating a portion of video data or a representation thereof that would cause corresponding images to be viewable by the user on a computer screen in response to the instantaneous head orientation and for displaying the images corresponding to the duplicated portion.

14 Claims, 8 Drawing Sheets

(51) Int. Cl.
  *G06F 1/16* (2006.01)
  *G06F 3/01* (2006.01)
  *G06F 3/14* (2006.01)
  *G09G 5/00* (2006.01)
  *G09G 3/00* (2006.01)

(52) U.S. Cl.
  CPC ............ *G06F 3/017* (2013.01); *G06F 3/1454* (2013.01); *G09G 3/001* (2013.01); *G09G 5/006* (2013.01); *G09G 2320/0693* (2013.01); *G09G 2354/00* (2013.01)

(58) Field of Classification Search
  USPC ....................................................... 345/158
  See application file for complete search history.

(56) References Cited

U.S. PATENT DOCUMENTS

| | | | |
|---|---|---|---|
| 9,176,582 B1 | 11/2015 | Johnson et al. | |
| 10,039,445 B1* | 8/2018 | Torch | G06K 9/0061 |
| 2006/0061544 A1* | 3/2006 | Min | G02B 27/0093 |
| | | | 345/156 |
| 2009/0189830 A1* | 7/2009 | Deering | G09G 3/02 |
| | | | 345/1.3 |
| 2010/0295769 A1* | 11/2010 | Lundstrom | G06F 3/011 |
| | | | 345/156 |
| 2012/0242697 A1 | 9/2012 | Border et al. | |
| 2013/0147836 A1* | 6/2013 | Small | G06F 3/011 |
| | | | 345/633 |
| 2013/0154913 A1* | 6/2013 | Genc | G06F 3/012 |
| | | | 345/156 |
| 2013/0329183 A1* | 12/2013 | Blum | G06F 3/0426 |
| | | | 351/158 |
| 2015/0015483 A1* | 1/2015 | Leigh | G06K 9/00597 |
| | | | 345/156 |
| 2015/0124069 A1* | 5/2015 | Tsukamoto | G06K 9/00604 |
| | | | 348/78 |
| 2015/0130688 A1* | 5/2015 | Li | G02B 27/017 |
| | | | 345/8 |
| 2015/0131159 A1* | 5/2015 | Lewis | G02B 27/0093 |
| | | | 359/630 |
| 2015/0199780 A1* | 7/2015 | Beyk | G06Q 50/184 |
| | | | 705/310 |
| 2015/0381885 A1 | 12/2015 | Kim et al. | |
| 2016/0004306 A1* | 1/2016 | Maltz | G06F 3/013 |
| | | | 345/173 |
| 2016/0025971 A1* | 1/2016 | Crow | G02B 27/0093 |
| | | | 345/156 |
| 2016/0206031 A1* | 7/2016 | Stoka | A41G 5/02 |
| 2017/0097753 A1* | 4/2017 | Bailey | G02B 27/0172 |
| 2017/0115483 A1* | 4/2017 | Aleem | G02B 27/0093 |
| 2017/0123492 A1* | 5/2017 | Marggraff | G06F 3/04886 |
| 2017/0185214 A1* | 6/2017 | Kojima | G06F 3/012 |
| 2017/0308690 A1* | 10/2017 | Tsukamoto | G06T 7/00 |
| 2017/0322623 A1* | 11/2017 | McKenzie | G06F 3/013 |
| 2018/0143436 A1* | 5/2018 | Xie | G02B 27/0172 |
| 2018/0176547 A1* | 6/2018 | Kobayashi | G06F 3/012 |
| 2019/0235624 A1* | 8/2019 | Goldberg | G02B 27/0093 |

\* cited by examiner

Fig. 1

33 — Initiating calibration process by displaying distinctive indication on predetermined region of computer screen 35 — User's head is moved until distinctive indication is displayed on LCD screen 37 — Confirming by blinking motion that distinctive indication is displayed on LCD screen 39 — Obtaining instantaneous user head orientation from movement sensor and determining orientation of imager aiming line constituting reference line 41 — Confirming by blinking motion that user is spaced from computer screen by default distance 43 — Raising head, following prompt, until upper computer screen margin is viewed on LCD screen 45 — Confirming by intentional blinking based motion that upper computer screen margin is viewed on LCD screen 47 — Repeating steps 43 and 45 for other computer screen margins until corresponding imager aiming line relative to reference line is determined 49 — Determining orientation of intermediate aiming line in response to obtained head orientation 51 — Determining displayed object that coincides with aiming line

SYSTEM FOR PROVIDING HANDS-FREE INPUT TO A COMPUTER

FIELD OF THE INVENTION

The present invention relates to the field of computer input devices. In particular, the present invention relates to a system for providing hands-free input to a computer, replacing the use of conventional input devices, such as a mouse, a keyboard and a touch screen.

BACKGROUND OF THE INVENTION

Various computer accessories, e.g. a mouse and a keyboard, require manual operation. Computer users with hand disabilities, such as hand paralysis, cannot use such accessories. Various solutions exist, requiring various levels of interaction by the user, and various levels of computing resources.

U.S. Pat. No. 5,682,210 discloses a contact lens video display system. A visual display in the form of a liquid crystal display (LCD) along with supporting circuitry, battery, and an antenna is formed into a contact lens, and the contact lenses are worn on the eyes covering the field of view. Eyeglass frames, connected to a data source which sends video data to the antenna, may support the contact lenses as well as eye movement sensors for sensing eyeball movement and direction of the movement. The image displayed on the LCD is changed in response to eye movements and eyelid blinking.

This system however, like similar systems, detects the user's line of sight by processing images of the user's eyes. This is a complex processing task, which requires extensive processing resources. It would therefore be desirable to operate computer accessories in a hands-free fashion while using a noncomplex method for detecting a user's line of sight.

It is therefore an object of the present invention to provide a system for enabling hands-free operation of computer accessories that are normally hand-operated.

It is another object of the present invention to provide a system for providing hands-free input to a computer.

It is yet another object of the present invention to provide a system for detecting a user's line of sight without having to process images of the user's eyes.

Other objects and advantages of the invention will become apparent as the description proceeds.

SUMMARY OF THE INVENTION

The present invention is directed to a system for providing hands-free input to a computer, comprising one or more artificial cilia mounts attached to an eyelid or eyelash of a user, by which one or more of the artificial cilia extending therefrom are adapted to cause generation of an input command in response to an intentional blinking motion; a computer to which blinking-derived input commands are transmittable, said computer comprising a video card interfacing with a running application on which is temporarily storable data by which output images for display are generatable, and a processor on which is executable a dedicated software module for managing operation of the system; a liquid crystal display (LCD) screen, a plurality of sensors for detecting a blinking-related selection operation being associated with said LCD screen; a head-mounted support structure for mounting said LCD screen within a selection-proximity distance from the artificial cilia; a movement sensor in data communication with the processor of said computer and mounted on said support structure, for detecting a calibrated instantaneous head orientation of said user; means for duplicating a portion of said stored video data or a representation thereof that would cause corresponding images to be viewable by said user on a computer screen in response to said instantaneous head orientation and for displaying said images corresponding to said duplicated portion on said LCD screen; and means for transmitting a signal generated by a corresponding one of said LCD-associated sensors in response to said blinking-related selection operation to said dedicated software module and for converting said transmitted signal to a corresponding input command.

As referred to herein, a "video card" is hardware including circuitry that is capable of receiving a data signal and converting said data signal to a video signal to be displayed, for example in conjunction with a VGA or DVI input, or for supporting a stationary or dynamic pixel map.

In one aspect, the means for duplicating a portion of said stored video data comprises a memory device, the processor which retrieves said stored video data and saves the same in said memory device, and a modulator for encoding said retrieved data onto a carrier wave. The means for displaying said images corresponding to said duplicated portion on said LCD screen comprises a transceiver mounted on the support structure and a demodulator.

In other embodiments, the system further comprises—
 i. a computer screen in viewing range of the user and in data communication with the computer, and the means for duplicating a portion of said stored video data or a representation thereof is a forwardly directed imager mounted on the support structure for capturing a portion of said computer screen coinciding with an instantaneous line of sight of the user, said instantaneous line of sight determined in response to the instantaneous head orientation;
 ii. a power supply mounted on the support structure for powering the imager, the LCD screen, the movement sensor, each of the LCD-associated sensors, and the means for transmitting a signal generated by a corresponding one of said LCD-associated sensors; or
 iii. means for differentiating between an involuntary blinking motion and an intentional blinking motion.

In one aspect, the stored video data that would cause corresponding images to be viewable by said user on a computer screen in response to said instantaneous head orientation is transmittable wirelessly and remotely to the transceiver, causing images corresponding to the duplicated portion to be displayed on the LCD screen.

In one aspect, the cilia mount comprises a single cilium which is reinforced by a plurality of spaced bracing elements.

DETAILED DESCRIPTION OF THE INVENTION

The present invention relates to a system for providing hands-free input to a computer, by which a displayed object is selected in response to an intentional blinking motion made by the user. This system is of great utility for users having an impaired hand function.

Figure 1:
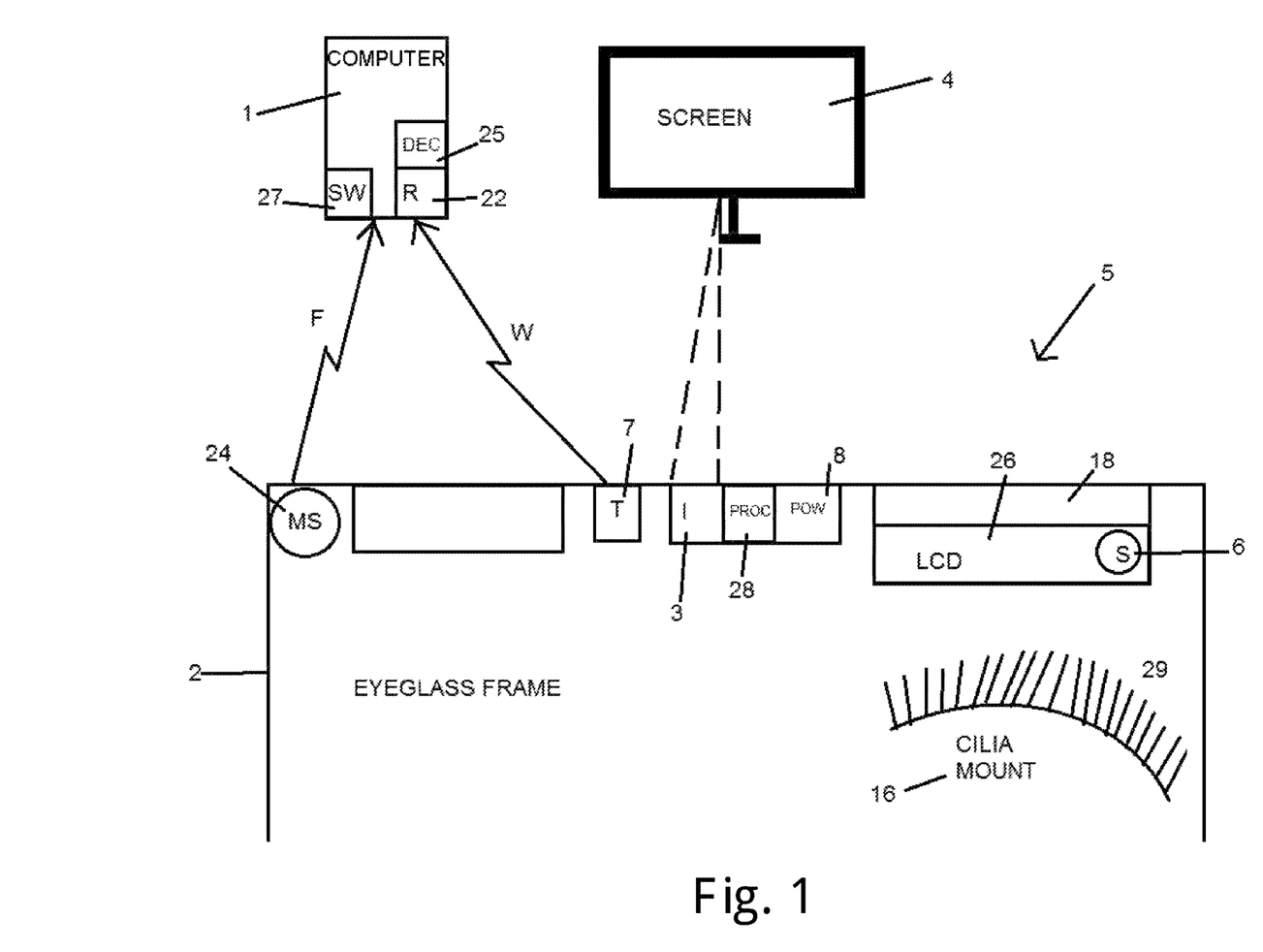
FIG. 1 is a schematic illustration of a system for providing hands-free input to a computer, according to an embodiment of the invention.

FIG. 1 schematically illustrates system 5 according to one embodiment of the invention. System 5 comprises computer 1 to which blinking-derived input commands are transmittable, and a user-wearable eyeglass frame 2 having a pair of lenses, on which is mounted a forwardly directed imager 3 (e.g., a camera) for capturing a portion of a computer screen 4 corresponding to the instantaneous line of sight 19 of the user. An LCD screen 26 in data communication with imager 3 is embedded in one of the lenses, and is used for displaying images appearing on the portion of computer screen 4 acquired by imager 3 in conjunction with frame-mounted processor 28.

LCD screen 26 may be of the resistive type which is locally deformed during a selection operation, the capacitive type which relies on the electrical properties of the human body to detect a touching operation, or the infrared type configured with a plurality of infrared light sources and corresponding receivers for detecting an interruption of the light emitted in a plane across the display surface, as well known to those skilled in the art.

Although system 5 is well suited for users having unimpaired eyesight by virtue of the uniformity of eyeglass frame 2 and of other components mounted thereon, users with impaired eyesight may also comfortably view images displayed on LCD screen 26 by adding a corrective lens to eyeglass frame 2, for example inserted within slot 18.

Also mounted on eyeglass frame 2 are a plurality of sensors 6 associated with LCD screen 26 for detecting a blinking-related selection operation, e.g. touch-sensitive sensors, a movement sensor 24 such as a gyro sensor for tracking head movement, a transmitter 7, such as a short-range transmitter, for transmitting to computer 1 a wireless signal W representative of an input command made in response to a blinking-derived selection, and a power supply 8 for powering, imager 3, sensors 6 and 24, transmitter 7, LCD screen 26 and processor 29.

Computer 1 is provided with a receiver 22 for receiving wireless signal W from transmitter 7 and with a dedicated software module 27 executable on a processor of the computer for managing operation of the system, including pairing of transmitter 7 and receiver 22, and for interfacing with the operating system and with the running application causing images to be displayed on computer screen 4 after signal W is received. Receiver 22 is also adapted to receive wireless signal F from movement sensor 24, which is paired therewith by means of dedicated software module 27. A decoder 25 decodes the transmitted data contained in wireless signals F and W with respect to the corresponding signal identifier and transfers the decoded data to dedicated software module 27 for further processing.

It will be appreciated that signals F and W may be transmitted over a wired connection.

In other embodiments, transmitter 7 and receiver 22 may each be replaced with a transceiver, to enable data processed by dedicated software module 27 to be transmitted to LCD screen 26.

The system further comprises one or more artificial cilia mounts 16 attached to a user's eyelid or eyelash, for allowing the user to select an object displayed on LCD screen 26 by intentionally moving or blinking the eyelid until one or more of the artificial cilia 29 extending from a mount 16 touches a selected sensor 6.

Each mount 16 may be one of two reusable magnetized strips from which a plurality of spaced artificial cilia 29 extend, such as the iLash® by Focallure™, which are magnetically secured together while the natural eyelashes are interposed therebetween. Alternatively, each mount 16 may be secured, for example releasably secured, to an eyelid. The artificial cilia 29, which may be electrically conductive, for use in conjunction with a capacitive-type LCD screen, or electrically non-conductive, are preferably flexible to a certain extent, although they may be reinforced or otherwise strengthened to restrict the degree of flexibility. All cilia 29 of a mount 16 may be of uniform length or, alternatively, the cilia of a given mount may be of differing length.

Prior to use of system 5 for making reliable input commands, head movement of the user which is correlated with imager movement must be properly calibrated.

Figure 2:
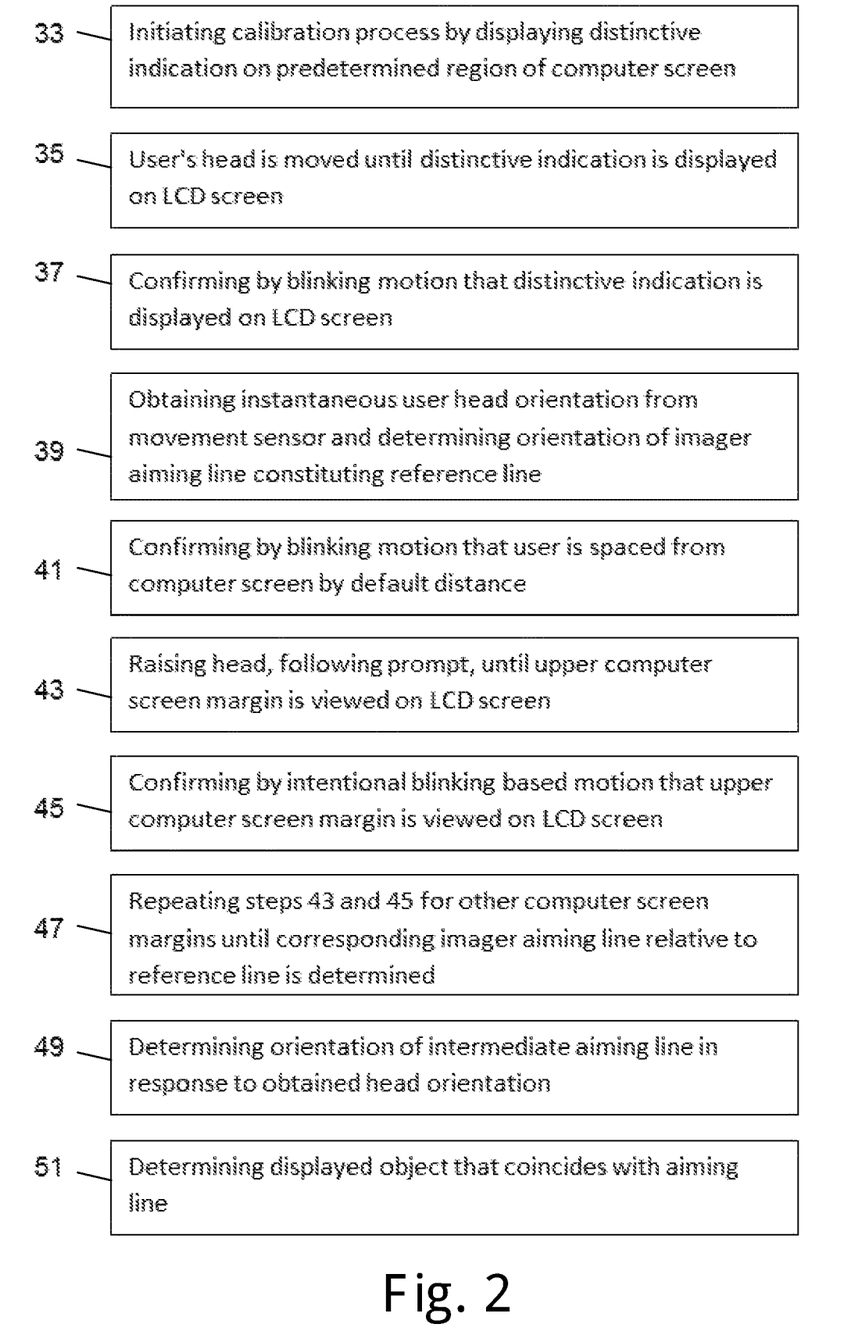
FIG. 2 is a flowchart for calibrating the system of FIG. 1.

As shown in FIG. 2, the dedicated software module first causes a distinctive indication to be displayed in step 33 on the computer screen, such as a bright red dot at the center of the computer screen. The user moves his head in step 35 until the distinctive indication is displayed on the LCD screen. Following appearance of the distinctive indication on the LCD screen, the user makes a blinking-based selection motion in step 37 to confirm that the distinctive indication has been viewed on the LCD screen. The instantaneous user head orientation is also obtained by the dedicated software module from the movement sensor through the intervention of the decoder in step 39. The user is also asked to confirm in step 41 by a blinking-based selection motion that he or she is spaced from the computer screen by a default distance of approximately one-half a meter. The dedicated software thus determines that the aiming line between a centerline of the imager's lens and the distinctive indication appearing on the computer screen at the instantaneous user head position and distance from the computer screen constitutes a reference line for subsequent steps of the calibration process.

Afterwards, the user is asked to raise his or her head in step 43 above the distinctive indication until the upper margin of the displayed portion of the computer screen is viewed on the LCD screen. The user then confirms in step 45 by an intentional blinking-based selection motion that the upper margin of the displayed portion of the computer screen is viewed on the LCD screen. Steps 43 and 45 are sequentially repeated mutatis mutandis until the lower margin, right margin and left margin of the displayed portion of the computer screen are viewed on the LCD screen. Following confirmation, the dedicated software determines in step 47 the orientation of the aiming line of the imager with respect to the reference line when impinging upon each of these extreme computer screen margins, after obtaining the corresponding instantaneous user head orientation. The dedicated software module consequently determines in step 49, for any given head orientation, the orientation of the corresponding aiming line of the imager when impinging upon an intermediate computer screen region located between the extreme margins, such as by interpolating with respect to the reference line. As the orientation of a given aiming line is known, and the dedicated software module interfaces with the operating system of the computer and with the running application, the dedicated software module determines in step 51 the object that is displayed on the computer screen region coinciding with the given aiming line.

Once the aiming line of the imager has been calibrated, input operations may be performed.

Figure 3:
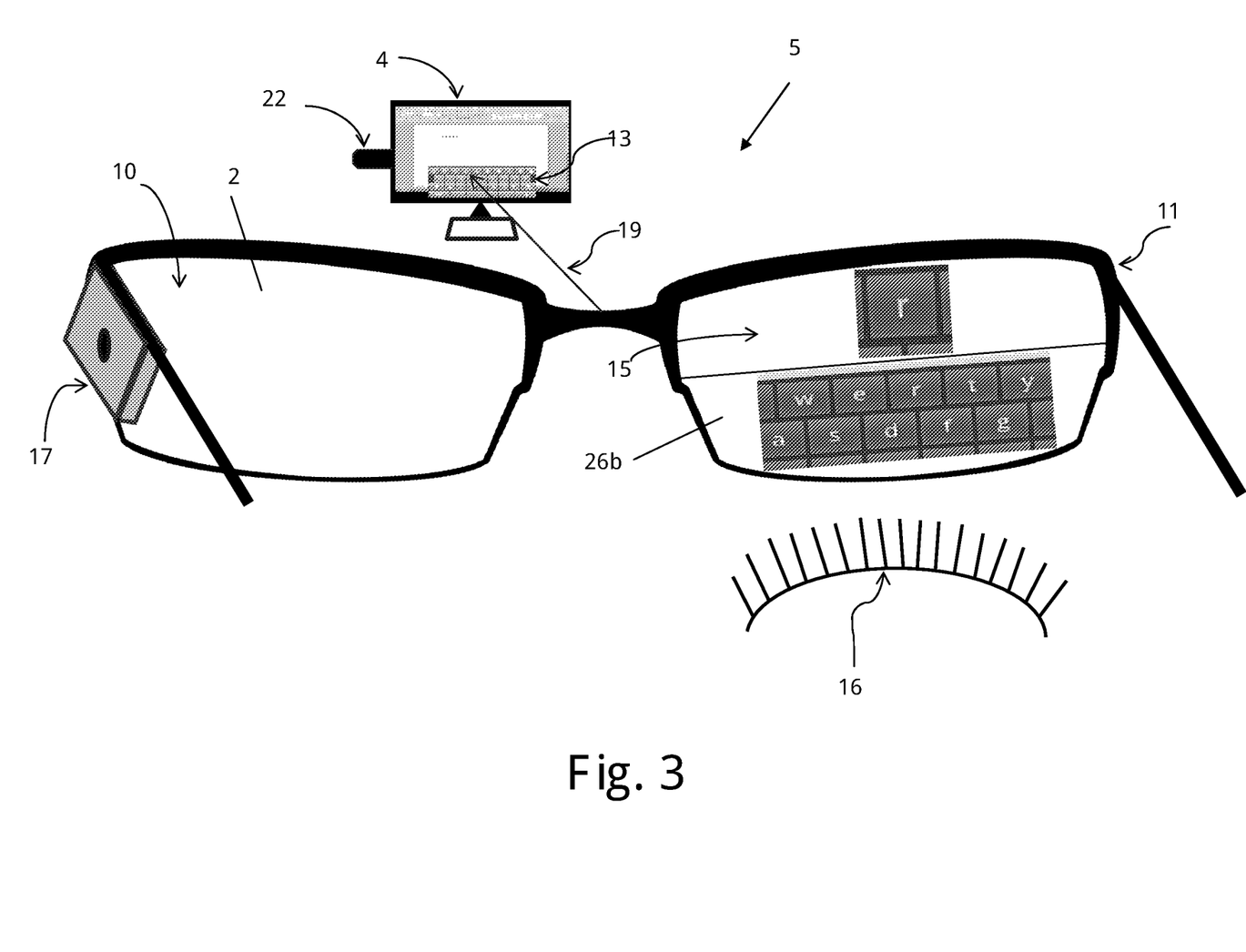
FIG. 3 is a schematic illustration of an implementation of the system of FIG. 1, shown in perspective view with respect to a wearer of eyeglasses.

FIG. 3 illustrates an implementation of system 5. The left lens 10 of eyeglass frame 2 is transparent in order to allow clear view of the computer screen 4, and the LCD screen which is embedded in the right lens 11 is divided into two sections 26a and 26b to display portions of the captured computer screen 4 located in front of the user. The electronic elements mounted on eyeglass frame 2 are powered by power supply 17, such as a bank of batteries.

In the illustrated example, the running computer application is a document editor, and the dedicated software module accordingly causes a virtual keyboard 13 to be displayed on computer screen 4. Imager aiming line 19 impinges upon a portion of the displayed virtual keyboard 13, and this portion in turn is displayed on the lower LCD screen section 26b. An enlarged representation of the portion displayed on lower LCD screen section 26b is displayed on upper LCD screen section 26a. Following the blinking-based selection with use of cilia mount 16, the generated wireless signal is transmitted by a Bluetooth transmitter to receiver 22, which protrudes from computer screen 4, and is converted into a computer input.

Figure 4:
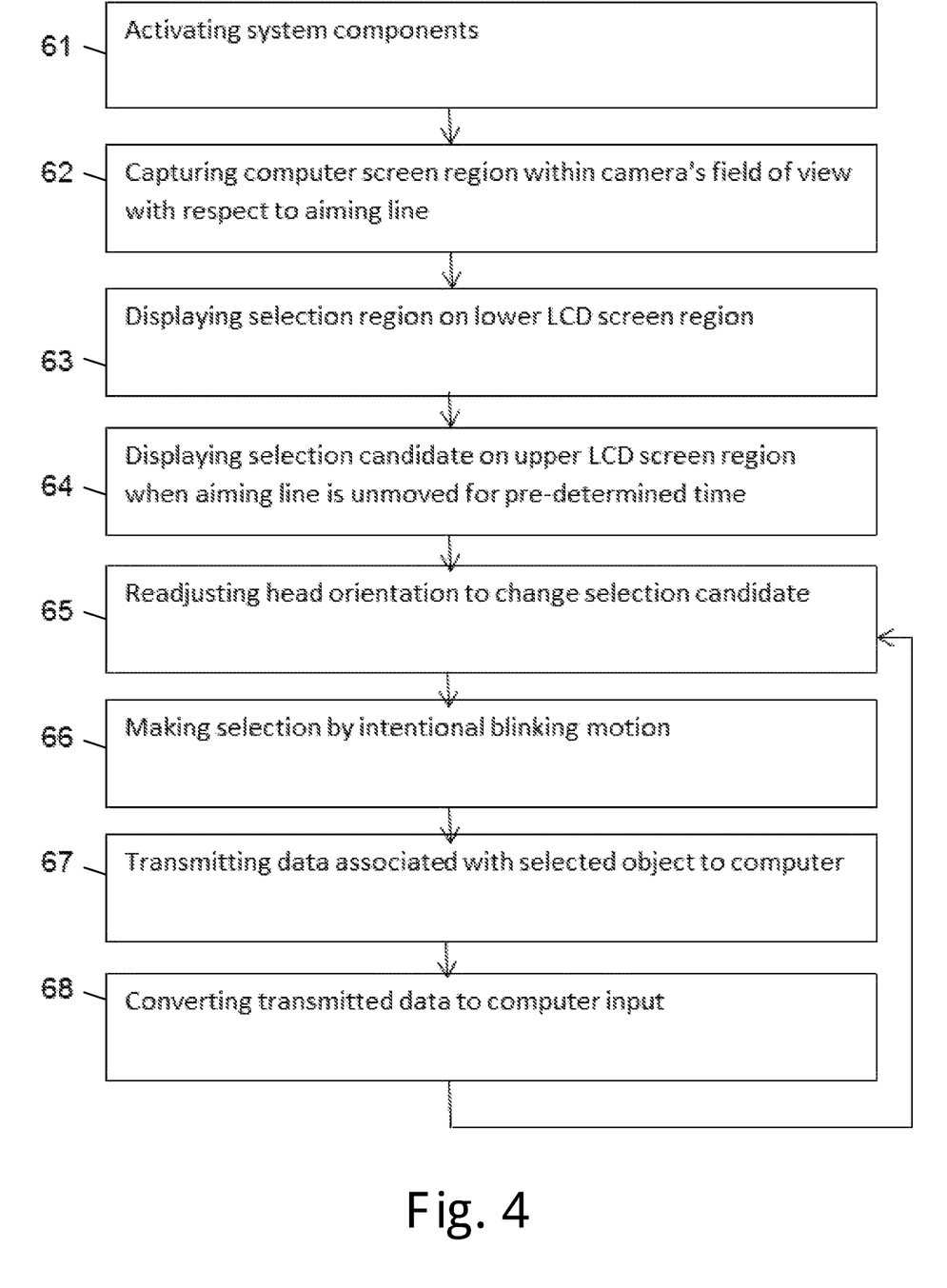
FIG. 4 is a flowchart of an embodiment of the process of operating the system of the present invention.

FIG. 4 illustrates a flowchart of an embodiment of the method of performing input operations in conjunction with the previously described system. While the user faces the computer screen, the user or caretaker activates in step 61 the activatable components of the system, including the digital camera.

In the next step 62, the camera captures all objects that are displayed on a portion of the computer screen region within the camera's field of view with respect to the given aiming line, and are displayed in step 63 on the lower LCD screen section. This portion will be referred to as a "selection region", since it assists the user during the selection process, providing the user with a relatively wide perspective regarding the selectable objects that are displayed on the computer screen. The user is able to scan other objects that are displayed on the computer screen by reorienting his or her head to readjust the aiming line, and then the newly captured objects are displayed on the lower LCD screen section.

Due to the nature of the blinking-based selection process of the present invention, some uncertainties may arise as to the actual object that is to be selected. When the aiming line is unmoved for more than a predetermined time, e.g. one-half a second, indicating that the user is glancing at a displayed object, the dedicated software module causes the displayed object that coincides with the given aiming line to be displayed on the upper LCD screen section in step 64. The object displayed on the upper LCD screen section will be referred to as a "selection candidate" as it may not actually be selected, but changed after the user notices that it is not the object intended to be selected. During display of the selection region and of the selection candidate, the image processor mounted on the eyeglass frame receives the image data captured by the camera and reduces the viewable size of the selection region and of the selection candidate to be displayed on the corresponding LCD screen section.

The relative location of the upper LCD screen section within the corresponding lens may be selected to ensure that the displayed selection candidate will be located along the pivoting path of the artificial cilia. The enlarged size of the selection candidate relative to an object of the selection region and the lack of other objects adjacent to the selection candidate ensure that the selection candidate will be reliably contacted by the artificial cilia during an intentional blinking-based selection.

A selection region may include the entire region, or a portion of, a virtual keyboard, an Internet browser window, or any other visual interactive interface from which the user may select or activate an object (e.g. a virtual button). Regarding the example of FIG. 3, the selection candidate is the letter "r" and the selection region includes the letters "w, e, r, t, y, a, s, d, f and g" of the displayed virtual keyboard.

At times, the aiming line coincides with a computer screen region that is between two objects. Due to the uncertainty of which object should be displayed as the selection candidate, the dedicated software module may determine not to display any selection candidate or, alternatively, may select to display one of the objects based on a probabilistic method. In the next step, 65, the user simply readjusts the head orientation in order to change the aiming line and the displayed selection candidate, until in the next step 66, the user makes a selection by an intentional blinking motion and making contact between the artificial cilia and a touch sensor provided with the LCD screen. Thus a viewed displayed object can be simply selected without having to resort to image processing of the user's eyes to determine the line of sight. In the next step 67, data associated with the selected object is transmitted to the computer, which, in the next step 68, converts the transmitted data into a computer input in similar fashion as a computer input from a mouse, keyboard or any other input device. After a first input operation has been performed, steps 65-68 are repeated to allow the user to make other selections. When desired, the user can deactivate the activatable components to end the selection process.

Since a user of the system makes a selection by performing a blinking motion, means are needed to differentiate between an involuntary blinking motion made to prevent access of foreign bodies into the eye and to assist in the lubrication of the corneal surface, and between an intentional blinking motion needed to select an object displayed on the LCD screen. The artificial cilia are able to apply a force to the LCD screen during both an involuntary blinking motion and an intentional blinking motion.

Figure 5:
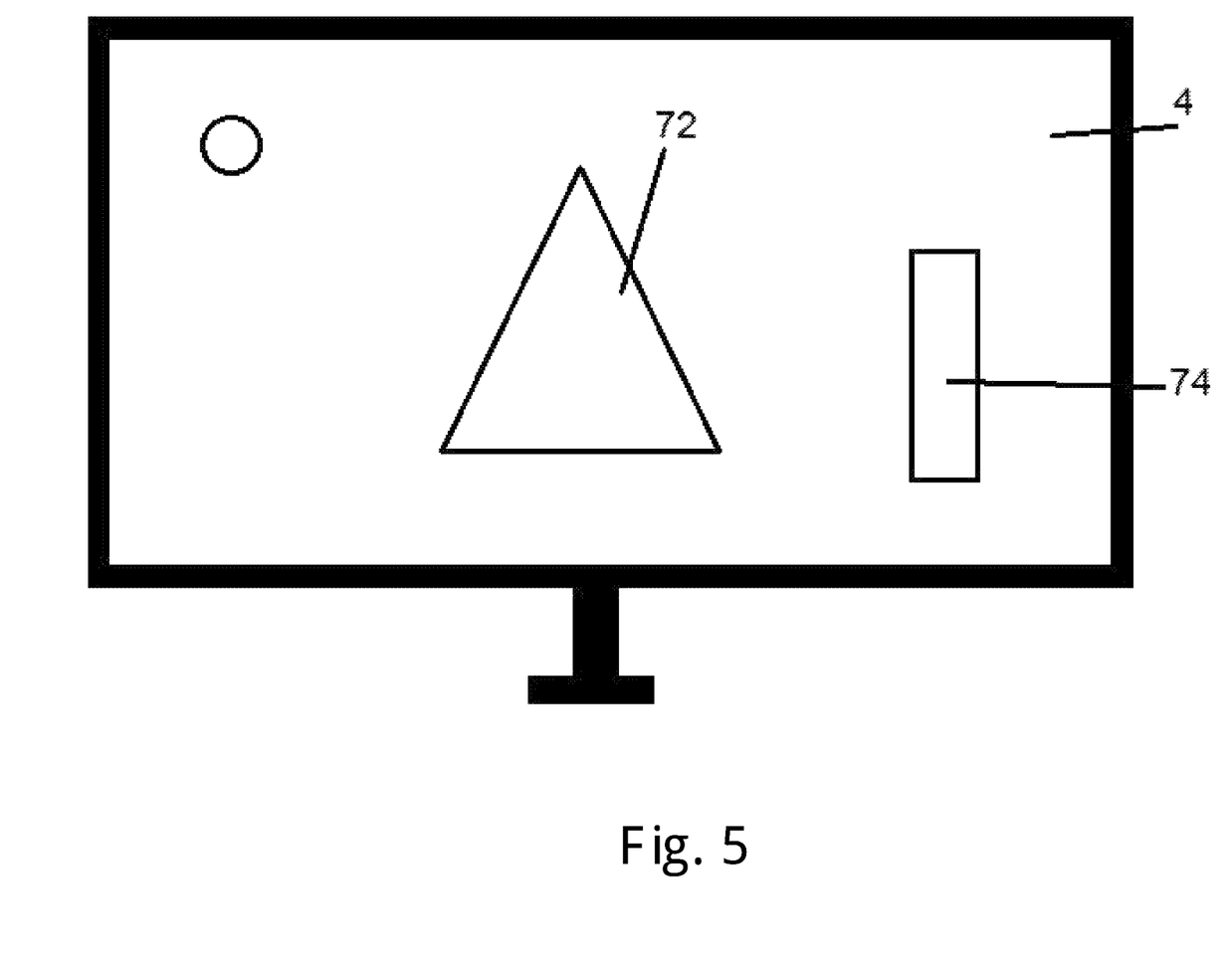
FIG. 5 is a front view of a computer screen, showing means for differentiating between an involuntary blinking motion and an intentional blinking motion.

In one embodiment, the dedicated software module, as shown in FIG. 5, generates a confirmation box 74 to one side of the normal display 72 of computer screen 4 generated by the operating system through the intervention of the running application. After an object is conditionally selected on the LCD screen by a blinking-based motion that causes the displayed object to be contacted and a wireless signal representative of the coordinates any other relevant data of the conditionally selected object to be transmitted to the computer, the dedicated software module is configured to wait in anticipation for selection of confirmation box 74 within a predetermined time, e.g. 1.5 seconds, following conditional selection. During this predetermined time, the user looks in the direction of confirmation box 74 until it is displayed on the LCD screen and is selected by an intentional blinking motion. If confirmation box 74 is selected within the predetermined time, the dedicated software module converts the transmitted data into an input command and transfers the same to the operating system.

Figure 6:
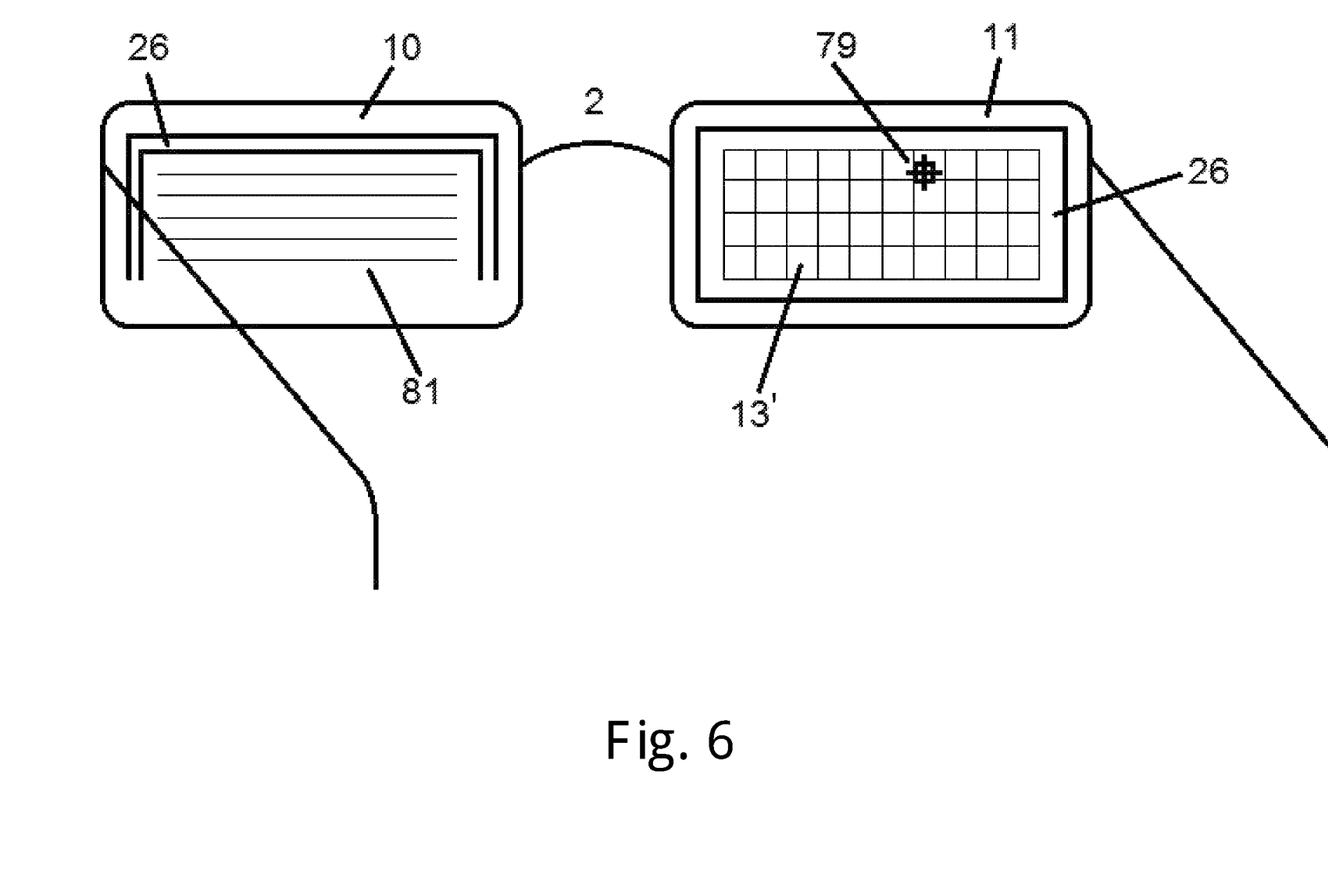
FIG. 6 is a schematic illustration of another implementation of the system of FIG. 1, shown in perspective view with respect to a wearer of eyeglasses.

In another embodiment shown in FIG. 6, within each of lenses 10 and 11 of eyeglass frame 2 is embedded a corresponding LCD screen 26. The dedicated software module is configured to cause an entire virtual keyboard 13' to be displayed on the LCD screen embedded within lens 11, when the user is performing interfacing operations during a typing mode, in accordance with a previously transmitted input command. Although virtual keyboard 13' displayed on the LCD screen may have a different arrangement than virtual keyboard 13 displayed on computer screen 4, all keys of virtual keyboard 13' may be displayed at once with sufficient resolution, for example when a large-sized lens is employed, to assist in increasing the speed of a blinking-based typing operation. The size of each key may be proportionally smaller than the size of the keys of a physical keyboard since they do not have to accommodate the pressing operation of a finger, but rather need only to accommodate the relatively thin dimension of the artificial cilia, and therefore may be all displayed at once on the LCD screen.

Alternatively, a portion of the virtual keyboard may be displayed on the LCD screen embedded within lens 11. An object may be accurately selected upon reorienting the aiming line until the object coincides with reticle 79 etched or otherwise provided with lens 11. The portion of the virtual keyboard that is displayed on the LCD screen may be calibrated in response to readings from movement sensor 24 (FIG. 1) in a way similarly to the method illustrated in FIG. 2. The displayed virtual keyboard portion may be derived from image data captured by the eyeglass frame mounted camera, or alternatively from a video transmitter interfacing with the operating system of the computer that transmits orientation-dependent video data saved in memory or displayed on the computer screen.

The text document 81 being typed with blinking-based motions is displayed on the LCD screen embedded within lens 10. Since one eye views virtual keyboard 13' and the other eye views text document 81, the blinking-based typing operation emulates use of a physical keyboard whereby the user reviews the text document displayed on a computer screen. If a blinking-typed character displayed on text document 81 is not the character intended to be selected, the user simply selects the backspace key by a blinking-based motion and types a different character. Reviewable and correctable text document 81 thus functions as the means for differentiating between involuntary blinking motion and an intentional blinking motion.

The image data for displaying virtual keyboard 13' and text document 81 may be transmitted to image processor 28 (FIG. 1), for example from the operating system of the computer, and then transferred to the two corresponding LCD screens by a multiplexer, a demodulator or other means for processing a digital data stream.

Blinking-based motions may be used to perform other typing or interfacing operations in addition to selection. For example, a context menu may be opened by selecting an object twice by a blinking-based motion within a predetermined time of e.g. 1 second, and then selecting one of the options. If one of the options was not yet selected, the selected object may be dragged upon movement of the user's head in a desired direction.

Figure 7:
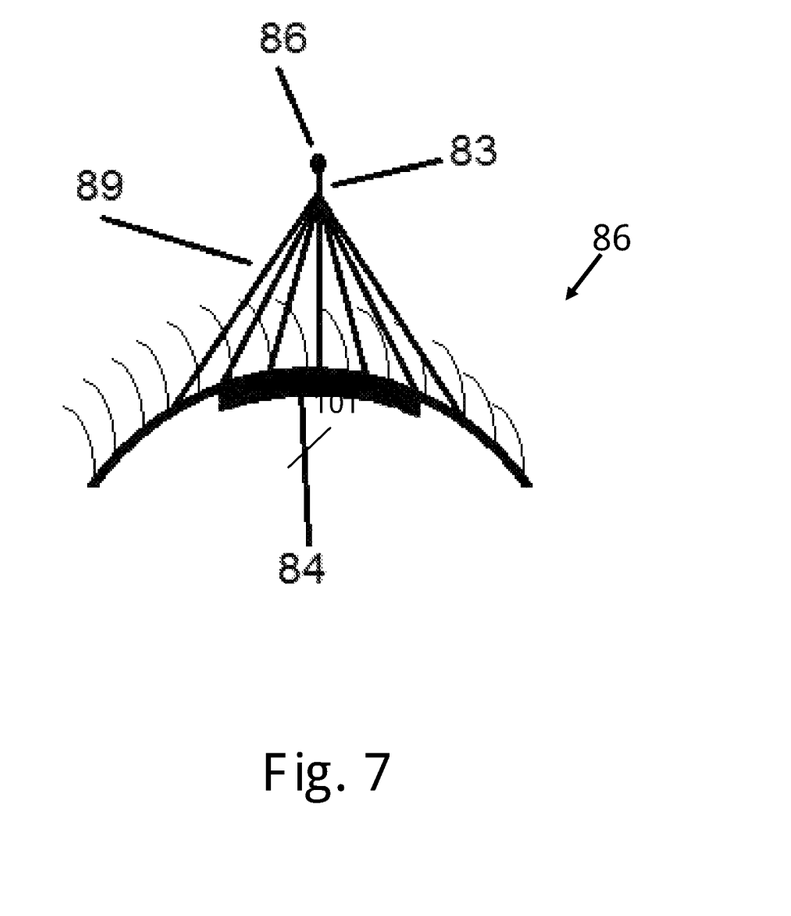
FIG. 7 is a top view of a cilia mount for use in conjunction with the system of FIG. 1, according to an embodiment of the invention.

Accurate blinking-based selection operations may be reliably performed with the use of cilia mount 86 shown in FIG. 7. A single artificial cilium 83 may extend distally from strip 84, which may be arcuate and magnetized. Single cilium 83 may be thickened at its proximal end and taper to a significantly narrower dimension at its terminal distal end 86, so as to be accurately positioned at an object to be selected which is displayed on the LCD screen. Cilium 83 may be reinforced by a plurality of spaced bracing elements 89 attached to strip 84.

Figure 8:
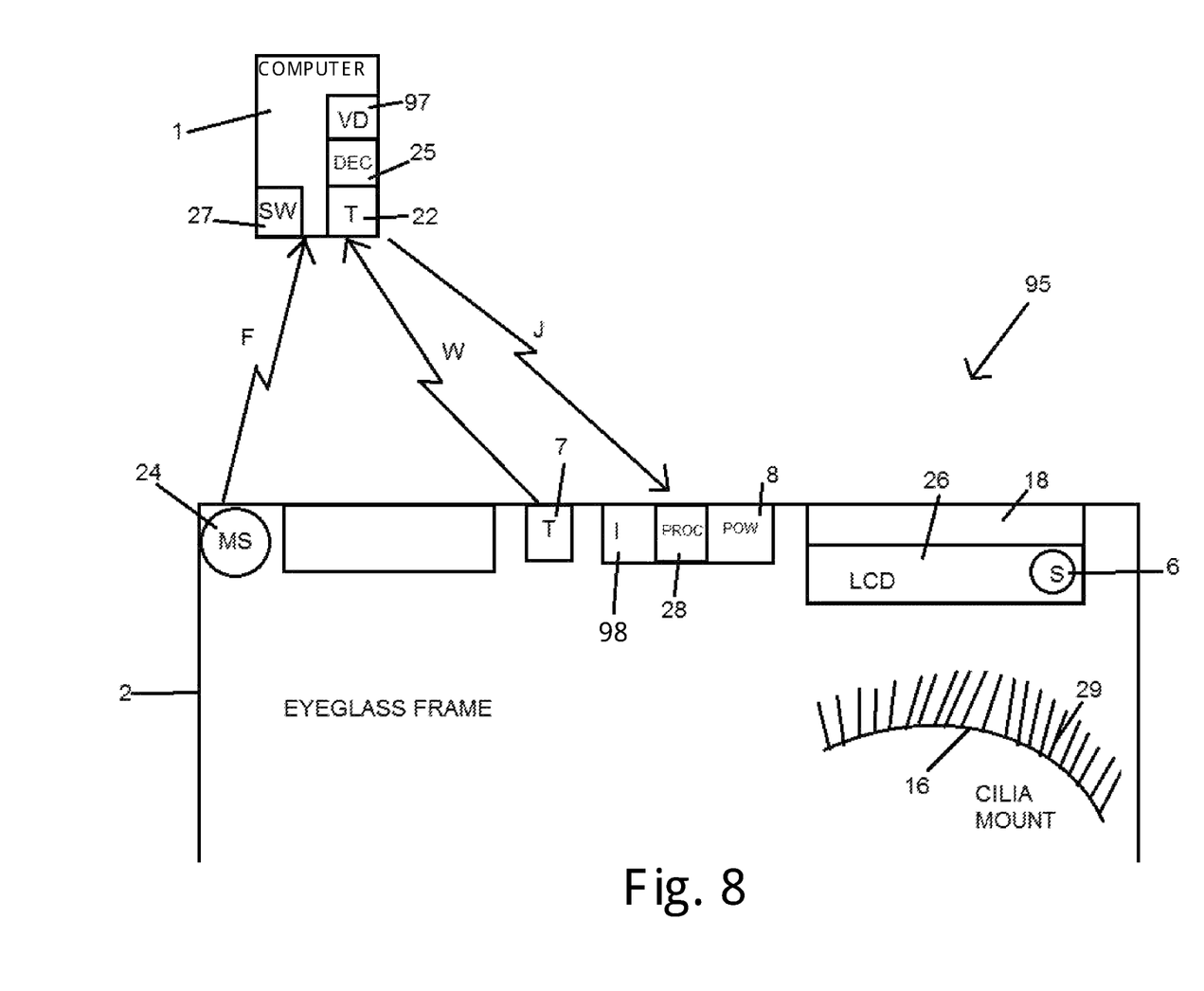
FIG. 8 is a schematic illustration of a system for providing hands-free input to a computer, according to another embodiment of the invention.

In another embodiment illustrated in FIG. 8, system 95 identical to system 5 of FIG. 1, but without need of the imager, is used for performing blinking-based selections remotely from the computer.

Data is transmitted wirelessly and remotely to eyeglass frame mounted modem 93 via signal J, for example from the operating system or video card 97 of computer 1, and transferred to eyeglass frame mounted signal processor 98 and then to one or both corresponding LCD screens 26 by a multiplexer, a demodulator or other means for processing a digital data stream. Some of the transmitted data includes instructions for calibration that is displayed on a LCD screen 26, such as when to look at a physical object and when to reorient the head. Following calibration, user head orientation is correlated to a line of sight and to a selectable object that is displayable on LCD screen 26 in response to the instantaneous head orientation.

As various embodiments have been described and illustrated, it should be understood that variations will be apparent to one skilled in the art without departing from the principles herein. Accordingly, the invention is not to be limited to the specific embodiments described and illustrated in the drawings.

The invention claimed is:

1. A system for providing hands-free input to a computer, comprising:
  a. one or more artificial cilia mounts attached to an eyelid or eyelash of a user, by which one or more of the artificial cilia extending therefrom are adapted to cause generation of an input command in response to an intentional blinking motion;
  b. a computer to which blinking-derived input commands are transmittable, said computer comprising a video card interfacing with a running application on which is temporarily storable data by which output images for display are generatable, and a processor on which is executable a dedicated software module for managing operation of the system;
  c. a liquid crystal display (LCD) screen, a plurality of sensors for detecting a blinking-related selection operation being associated with said LCD screen;
  d. a head-mounted support structure for mounting said LCD screen within a selection-proximity distance from the artificial cilia;
  e. a movement sensor in data communication with the processor of said computer and mounted on said support structure, for detecting a calibrated instantaneous head orientation of said user;
  f. means for duplicating a portion of said stored video data or a representation thereof that would cause corresponding images to be viewable by said user on a computer screen in response to said instantaneous head orientation and for displaying said images corresponding to said duplicated portion on said LCD screen; and
  g. means for transmitting a signal generated by a corresponding one of said LCD-associated sensors in response to said blinking-related selection operation to said dedicated software module and for converting said transmitted signal to a corresponding input command.

2. The system according to claim 1, wherein the head-mounted support structure is an eyeglass frame configured with first and second lenses.

3. The system according to claim 2, wherein the first lens is transparent and the LCD screen is embedded in the second lens.

4. The system of claim 2, further comprising means for differentiating between an involuntary blinking motion and an intentional blinking motion.

5. The system of claim 4, wherein the means for differentiating between an involuntary blinking motion and an intentional blinking motion is a displayed confirmation box, the signal generated by a corresponding one of said LCD-associated sensors in response to said blinking-related selection operation being convertible to a corresponding input command if said confirmation box is selected within a predetermined time following conditional selection of an object displayed on the LCD screen by a blinking-based motion.

6. The system of claim 4, wherein a first LCD screen is embedded in the first lens and a second LCD screen is embedded in the second lens.

7. The system of claim 6, wherein the dedicated software module is configured to cause an entire virtual keyboard or a portion thereof to be displayed on the first LCD screen during a typing mode, and the means for differentiating between an involuntary blinking motion and an intentional blinking motion is a reviewable and correctable text document displayed on the second LCD screen which is generated upon interfacing with said virtual keyboard or a portion thereof.

8. The system according to claim 1, further comprising a computer screen in viewing range of the user and in data communication with the computer, and the means for duplicating a portion of said stored video data or a representation thereof is a forwardly directed imager mounted on the support structure for capturing a portion of said computer screen coinciding with an instantaneous line of sight of the user, said instantaneous line of sight determined in response to the instantaneous head orientation.

9. The system according to claim 8, further comprising a power supply mounted on the support structure for powering the imager, the LCD screen, the movement sensor, each of the LCD-associated sensors, and the means for transmitting a signal generated by a corresponding one of said LCD-associated sensors.

10. The system according to claim 1, wherein the means for transmitting a signal generated by a corresponding one of said LCD-associated sensors is a transmitter or transceiver.

11. The system of claim 10, wherein the stored video data that would cause corresponding images to be viewable by said user on a computer screen in response to said instantaneous head orientation is transmittable wirelessly and remotely to the transceiver, causing images corresponding to the duplicated portion to be displayed on the LCD screen.

12. The system of claim 1, wherein said LCD screen is divided into a first section that displays a selection candidate and into a second section that displays a selection region.

13. The system of claim 1, wherein the LCD screen is selected from the group consisting of a resistive type which is locally deformed during a selection operation, a capacitive type relying on human body electrical properties to detect a touching operation, an infrared type configured with a plurality of infrared light sources and corresponding receivers for detecting an interruption of light emitted in a plane across display surface during a selection operation, and a combination thereof.

14. The system of claim 1, wherein the cilia mount comprises a single cilium which is reinforced by a plurality of spaced bracing elements.

\* \* \* \* \*